F. F. BOURDIL.
SAFETY DEVICE FOR OVERHEAD ELECTRIC LINES.
APPLICATION FILED DEC. 21, 1910.
1,094,699. Patented Apr. 28, 1914.
4 SHEETS—SHEET 1.
Fig. 3.
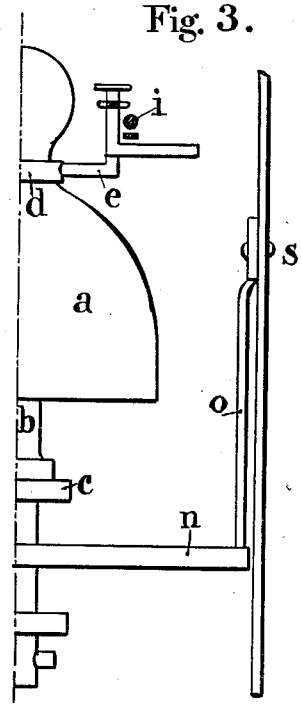
Fig. 1.
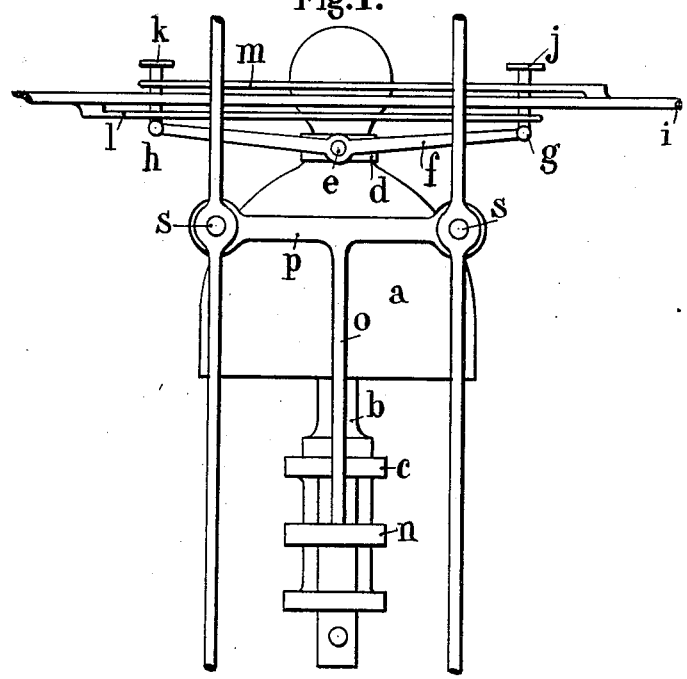
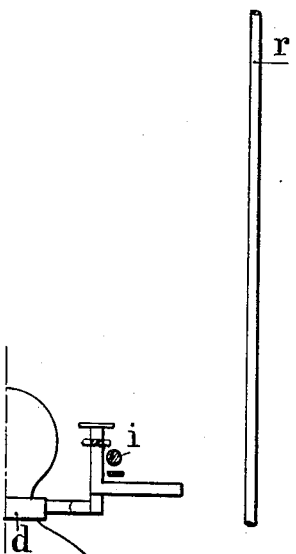
WITNESSES:
G. V. Rasmussen
Louis Alexander
INVENTOR
François F. Bourdil
BY
Biesen Knauth
ATTORNEYS F. F. BOURDIL.
SAFETY DEVICE FOR OVERHEAD ELECTRIC LINES.
APPLICATION FILED DEC. 21, 1910.
1,094,699.
Patented Apr. 28, 1914.
4 SHEETS—SHEET 2.
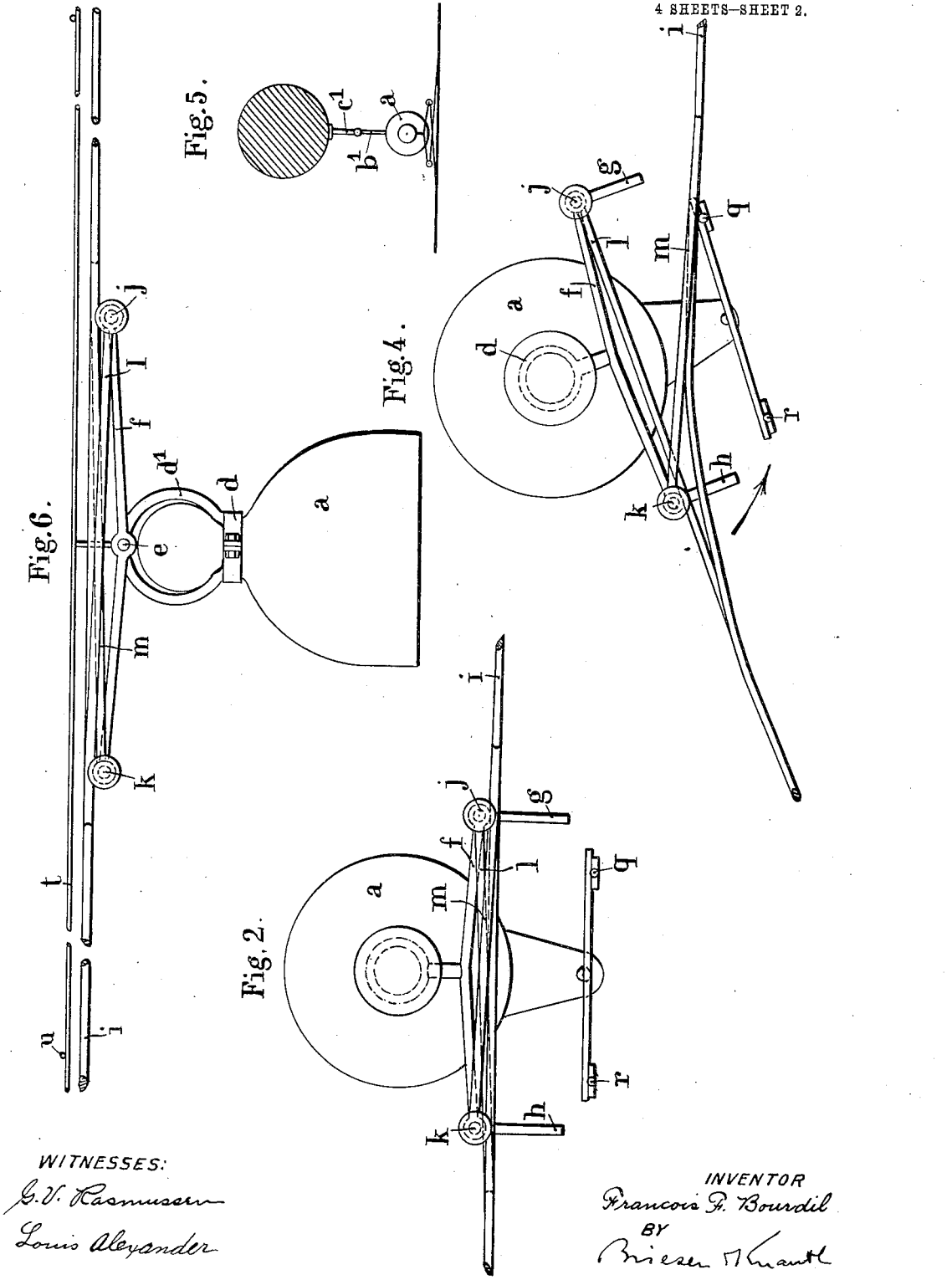
WITNESSES:
G. V. Rasmussen
Louis Alexander
INVENTOR
Francois F. Bourdil
BY
Brieser & Knauth
ATTORNEYS F. F. BOURDIL.
SAFETY DEVICE FOR OVERHEAD ELECTRIC LINES.
APPLICATION FILED DEC. 21, 1910.
1,094,699.
Patented Apr. 28, 1914.
4 SHEETS—SHEET 3.
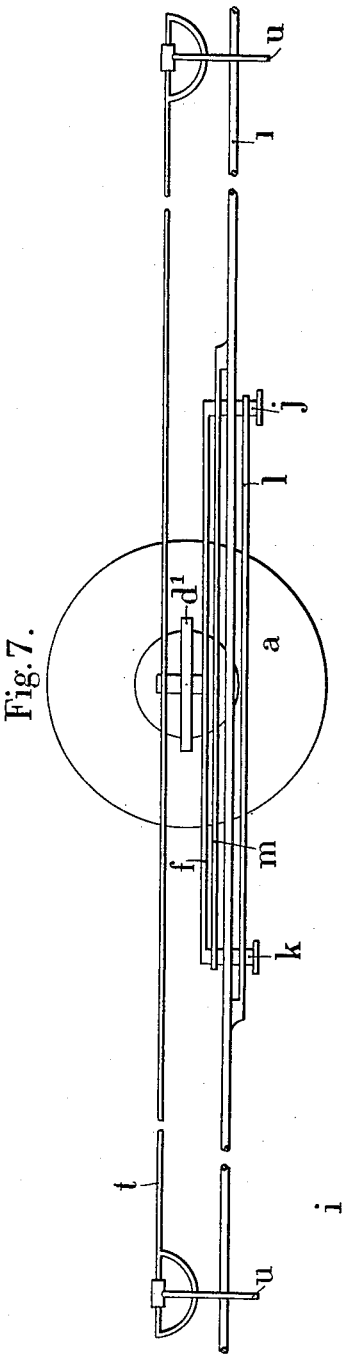
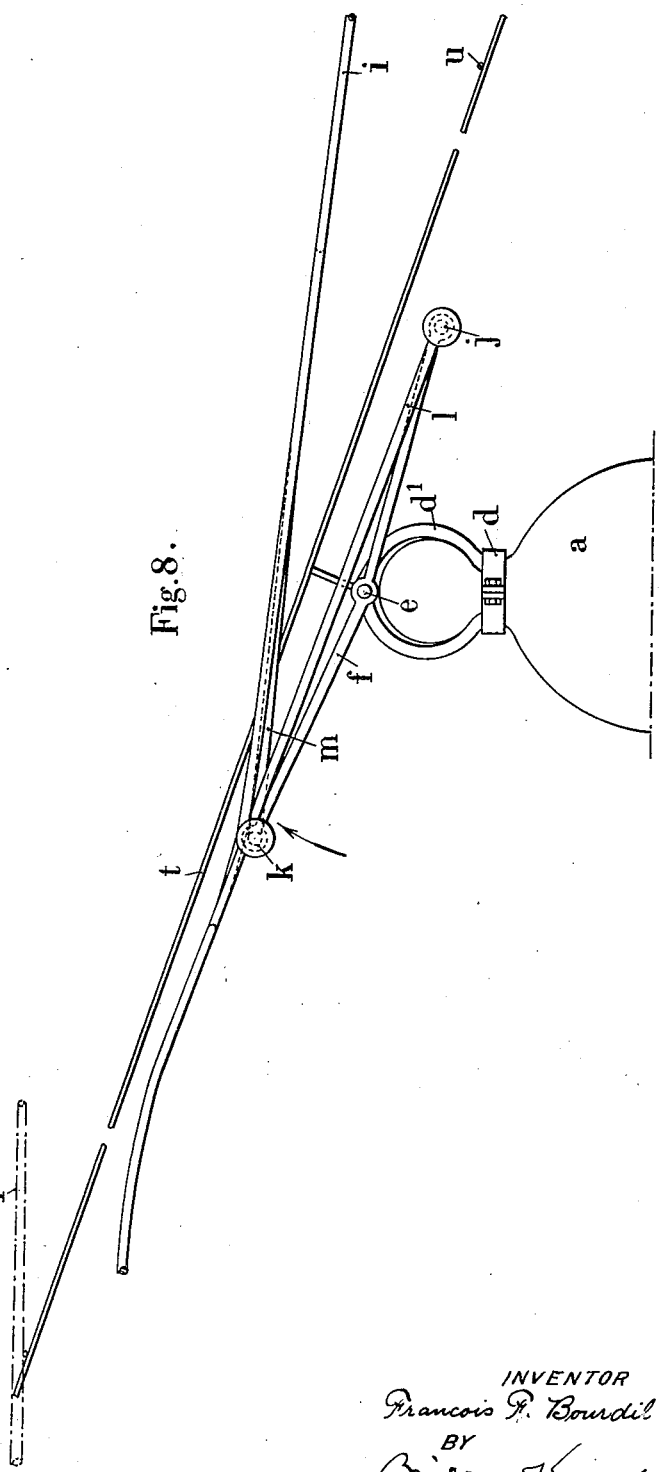

F. F. BOURDIL.
SAFETY DEVICE FOR OVERHEAD ELECTRIC LINES.
APPLICATION FILED DEC. 21, 1910.
1,094,699.
Patented Apr. 28, 1914.
4 SHEETS—SHEET 4.
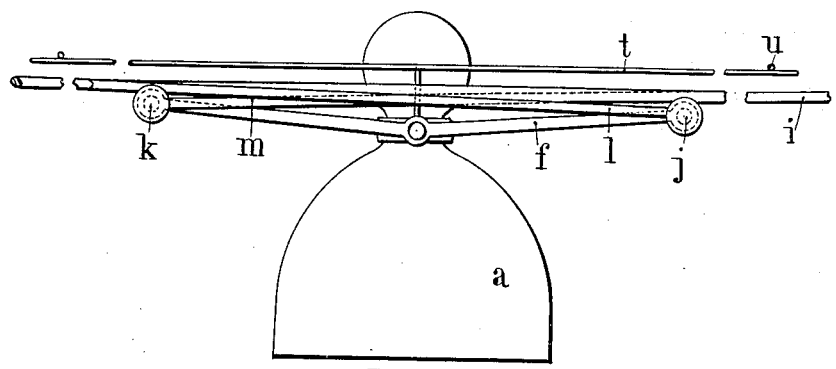
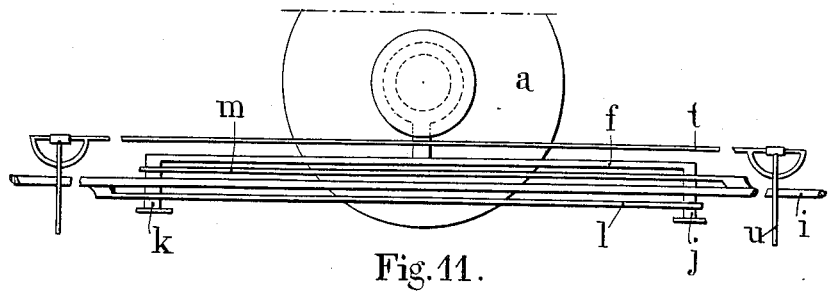
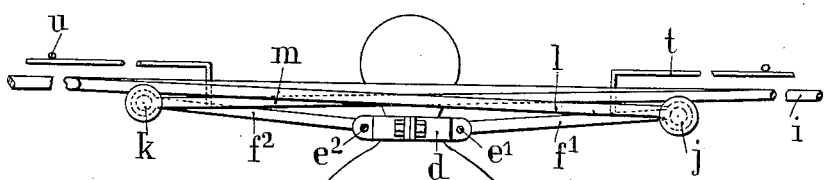
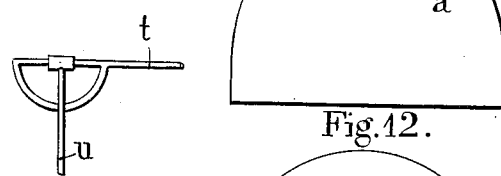
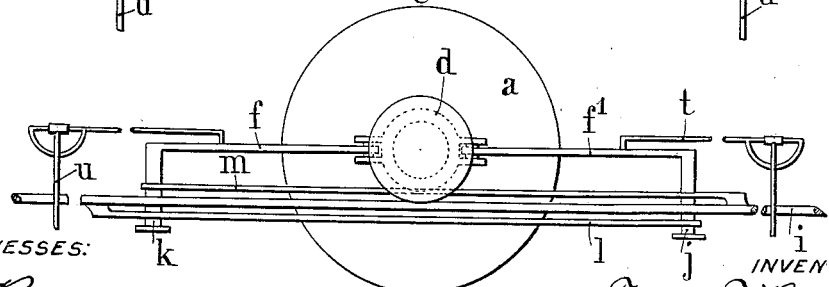

UNITED STATES PATENT OFFICE.

FRANCOIS FERNAND BOURDIL, OF PARIS, FRANCE, ASSIGNOR TO SOCIÉTÉ ANONYME "APICEA," OF PARIS, FRANCE.

SAFETY DEVICE FOR OVERHEAD ELECTRIC LINES.

1,094,699. Specification of Letters Patent. Patented Apr. 28, 1914.

Application filed December 21, 1910. Serial No. 598,650.

*To all whom it may concern:*

Be it known that I, FRANCOIS FERNAND BOURDIL, of 29 Rue Octave Feuillet, in the city of Paris, Republic of France, engineer, have invented Improvements in Safety Devices for Overhead Electric Lines, of which the following is a full, clear, and exact description.

Various types of automatic safety devices for high tension overhead electric lines have been devised with the object of rendering the end of the wire harmless if a conducting wire should break. Broadly speaking these various types of device comprise a movable member to which the conducting wire is attached; normally this movable member is subjected on either side to the tensions exerted by the length of this conductor in front of and behind it respectively; in case one of these lengths should break it is displaced under the influence of the tension exerted by the unbroken length and either earths this conductor or short circuits it with an adjacent conductor.

The present invention has for its object a special means for attaching the conducting wire to these types of safety device, said means being devised in such a manner as to enable these devices if the line wire should break to act very rapidly in both directions while on the other hand normally insuring the fixity of the line. This improved means is broadly characterized by the fact that the movable member presents two points of attachment for the line wire situated on either side of its axis of rotation and that each of the lengths of the conducting wire in front and behind the device is connected by the intermediary of a special system of connection with the point of attachment located beyond the axis of rotation.

The improved device forming the object of the invention is illustrated by way of example in the accompanying drawing in which:

Figures 1 and 2 show in elevation and in plan an embodiment of the invention in which the safety device is displaced in a horizontal plane. Fig. 3 is a side elevation. Fig. 4 is a plan view of the device with one of the lengths of conducting wire broken. Fig. 5 is a modification of my invention, the view being part section and part plan. Figs. 6 and 7 represent in elevation and in plan another application in which the device moves in a vertical plane. Fig. 8 is an elevation of this device with one of the lengths of line broken. Figs. 9 and 10 illustrate a modification in elevation and in plan. Figs. 11 and 12 show another modification in elevation and in plan. Figs. 13 and 14 are two detail views showing two methods of mounting the connecting arms.

In the device represented in Figs. 1 to 4 the insulator $a$ which is fixed to a vertical rod $b$ carried by a pole or other suitable support able to pivot freely in its support $c$ is provided with a collar $d$ presenting an arm $e$ which carries a rod $f$, the two ends of which are equidistant from this arm $e$; this rod which is thus able to rotate at the same time as the insulator $a$ is normally parallel with the line. At its ends this rod $f$ presents two small horizontal branches $g$, $h$, upon which the line wire $i$ is able to rest and two small vertical arms $j$, $k$ respectively constitute the axes of rotation of two connecting rods $l$, $m$; these two rods intersect as shown in Fig. 2 in such a manner that the rod $l$ pivoting on the right hand end $j$ of the rod $f$ may be fixed at its free extremity to the left hand length of the conducting wire $i$ and that the rod $m$ pivoting on the left hand end $k$ of the rod $f$ may be fixed at its free end to the right hand length of said conducting wire $i$. By this means the left hand length of the line wire is connected by the rod $l$ to the right hand end extremity of the rod $f$ and the right hand length of this line wire is connected by the rod $m$ with the left hand end of this rod $f$.

The line wire is fixed at the free end of each of the rods $l$, $m$ either by binding or by means of a collar or flange or by soldering or in any other convenient manner.

The connecting rods may be replaced by cables, chains, wires or any other connection capable of pivoting at the ends $j$, $k$ of the rod $f$.

The vertical rod $b$ of the insulator comprises a horizontal arm $n$ at the end of which a vertical rod $o$ is mounted; this rod may either be extended sufficiently to establish a connection with the adjacent line when the apparatus rotates upon the breaking of a wire as hereinafter explained or it may end in a cross piece $p$ straight or curved at the ends of which two rods or beams $q$ $r$ rotatable around their pivots s are mounted on either side of the rod o.

Normally the horizontal rod f is parallel with the line and the device as a whole is maintained at rest by the tension exerted by each of the two lengths of the line wire i; further any angular displacement of the rod f in its horizontal plane is prevented owing to the fact that the vertical arms j k bear against this line wire. If one of the lengths of the line wire, the left hand length for example should break the tensions no longer balance each other, the unbroken right hand length exerts traction upon the left hand end of the rod f and causes the insulator a to rotate about itself in the direction indicated by the arrow in Fig. 4; the insulator carries with it the arm n and the beam q bears against the lines to be connected; owing to the pivot s the beam q can incline, and, consequently, when the pivoting movement of the insulator has taken place, said beam can bear at the same time against two superposed line wires, as illustrated in Fig. 3, whether these lines are or are not in the same plane. If, on the other hand, the right hand length of the line wire should break the device is drawn in the opposite direction by the unbroken left hand length and the beam r then makes the connections.

It should be noted that this device is equally applicable when the axis of the insulator is horizontal; in this case the rod f moves in a vertical plane.

Fig. 5 represents the application of the device in a case where the insulator instead of pivoting about its axis is carried by an arm b' pivoted to a support c' fixed to the pole.

Figs. 6 to 8 illustrate another application of the present device where the insulator is fixed. In this application the insulator a is provided with a collar d surmounted by a fork d'; a pivot e is able to rotate in this fork and carries a rod f constituting a beam capable of displacement in its vertical plane. At its ends this rod f presents two small horizontal branches j k upon which the line wire i rests; these branches form the pivots of the two rods l m. As shown in Fig. 7 the free end of these rods is connected with the line wire as previously stated in such a manner that the right hand length of the wire is connected with the left hand end of the rod f, while the left hand length is connected with the right hand end of the rod. Upon the pivot e' there is fixed a lever t carrying a branch u at each of its ends; these branches are kept horizontal and are intended, if the wire i should break, to establish a connection between this wire and an adjacent parallel line i. Each branch is preferably mounted in such a manner that it is able to yield in one direction of rotation of the rod f so that if in the displacement of the lever t one of these branches encounters the line wire it cannot impede the operation of the apparatus.

The connecting branches u are mounted as shown in Fig. 13 or Fig. 14 according as they are arranged above or below the line wire. In the case represented in Fig. 13 the branch u is able to yield in the downward movement and resume its normal position under the influence of gravity while in the case illustrated in Fig. 14 the branch u is able to yield in the upward movement and resume its normal position under the influence of the counterweight u'. These connecting branches u might equally well be mounted upon extensions of the rod or beam f.

In the position of repose the rod or beam f remains horizontal under the influence of substantially equal tractional efforts exerted on the ends j k by the two lengths of line wire and the line is not exposed to any harmful displacement.

If one of the lengths of line wire should break, the left hand length for example, the rod or beam f at once pivots in the direction indicated by the arrow in Fig. 8 under the influence of the weight of the unbroken length upon its right hand end j and of the traction exerted by this length upon its left hand end k; the lever t participates in this movement and one of the branches u carried by the latter encounters the conducting wire of the adjacent line and thus establishes connection between the broken line and the adjacent line.

The rod or beam f instead of being located above the insulator might be mounted in front as shown in Figs. 9 and 10. This rod or beam f might likewise be replaced by two levers f' f² rotatable about pivots e' e² respectively carried by a collar d fixed to the insulator a as shown in Figs. 11 and 12; these levers are arranged in such a manner as to pivot in rising above their normal position but they cannot descend below this position.

In the various types of device described above the connecting rods instead of acting upon an adjacent line might make contact with some convenient form of earthing device.

In all these various devices the safety means by reason of its special method of connection with the conductor becomes operative instantaneously when the line wire breaks and is able to act in both directions while normally insuring fixity of the line.

Claims:

1. A safety device for an electric conductor comprising insulated centrally pivoted and oppositely directed branches adjacent to said conductor, two connections crossing each other and respectively joining the outer end of each branch to a point of the conductor opposite the other branch, and electrical connecting means joined to said branches so as to move therewith for the purpose described.

2. A safety device for an electric conductor comprising insulated centrally pivoted and oppositely directed branches adjacent to said conductor, two connections crossing each other and respectively joining the outer end of each branch to a point of the conductor opposite the other branch, horizontally projecting branches attached to said first-named branches, and electrical connecting means joined to said horizontal branches so as to move therewith for the purpose described.

3. A safety device for an electric conductor comprising insulated centrally pivoted and oppositely directed branches adjacent to said conductor, two connections crossing each other and respectively joining the outer end of each branch to a point of the conductor opposite the other branch, horizontal projections at the outer ends of said branches for serving as supports for the line wire, vertical projections at the outer ends of said branches for abutting against the line wire and normally preventing any angular displacement of the device as well as any longitudinal displacement of the line wire, and electrical connecting means joined to the branches so as to move therewith.

The foregoing specification of my improvements in safety devices for overhead electric lines signed by me this ninth day of December 1910.

FRANCOIS FERNAND BOURDIL.

Witnesses:
DEAN B. MASON,
R. EHIRIOT.

---

Copies of this patent may be obtained for five cents each, by addressing the "Commissioner of Patents, Washington, D. C."